United States Patent
Schoeneman et al.

(10) Patent No.: US 10,267,212 B1
(45) Date of Patent: Apr. 23, 2019

(54) FLUID LOOP FILLING ASSEMBLY AND FILLING METHOD

(71) Applicant: Ford Global Technologies, LLC, Dearborn, MI (US)

(72) Inventors: Christian Brent Schoeneman, Southgate, MI (US); Michael Joseph Giunta, Livonia, MI (US); Erin Gibb, Belle River (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/786,522

(22) Filed: Oct. 17, 2017

(51) Int. Cl.
| | | |
|---|---|---|
| *F01P 11/02* | (2006.01) | |
| *F01P 7/16* | (2006.01) | |
| *F01P 7/14* | (2006.01) | |
| *H01M 10/663* | (2014.01) | |
| *H01M 10/60* | (2014.01) | |

(52) U.S. Cl.
CPC .............. *F01P 11/029* (2013.01); *F01P 7/16* (2013.01); *F01P 2007/146* (2013.01); *H01M 10/60* (2015.04); *H01M 10/663* (2015.04)

(58) Field of Classification Search
CPC .............. F01P 11/029; F01P 2011/0233; F01P 11/0238; F01P 2011/0266; F01P 2007/143; F01P 7/14
See application file for complete search history.

(56) References Cited

U.S. PATENT DOCUMENTS

| | | |
|---|---|---|
| 3,752,132 A | 8/1973 | Bentz et al. |
| 8,601,986 B2 | 12/2013 | Faulkner et al. |
| 9,680,190 B1 | 6/2017 | Xia |
| 2015/0308326 A1 | 10/2015 | Davies et al. |
| 2015/0345368 A1* | 12/2015 | Le Poul ................ F01P 11/029 123/41.51 |

FOREIGN PATENT DOCUMENTS

CN    105914423    8/2016

* cited by examiner

*Primary Examiner* — Jacob M Amick
(74) *Attorney, Agent, or Firm* — Carlson, Gaskey & Olds, P.C.

(57) ABSTRACT

An exemplary assembly includes, among other things, a manifold having an interior area with a baffle, and a reservoir. The baffle divides a portion of the interior area into a first region that is part of a first fluid loop of a vehicle, and a second region that is part of a separate, second fluid loop of the vehicle. The reservoir is configured to hold a supply of liquid that is in fluid communication with both the first and second regions. An exemplary method includes, among other things, communicating a fluid from a supply within a reservoir to both a first and a second region within an interior area of a manifold. The first region is part of a first fluid loop of a vehicle. The second region is part of a separate second fluid loop of the vehicle.

18 Claims, 3 Drawing Sheets

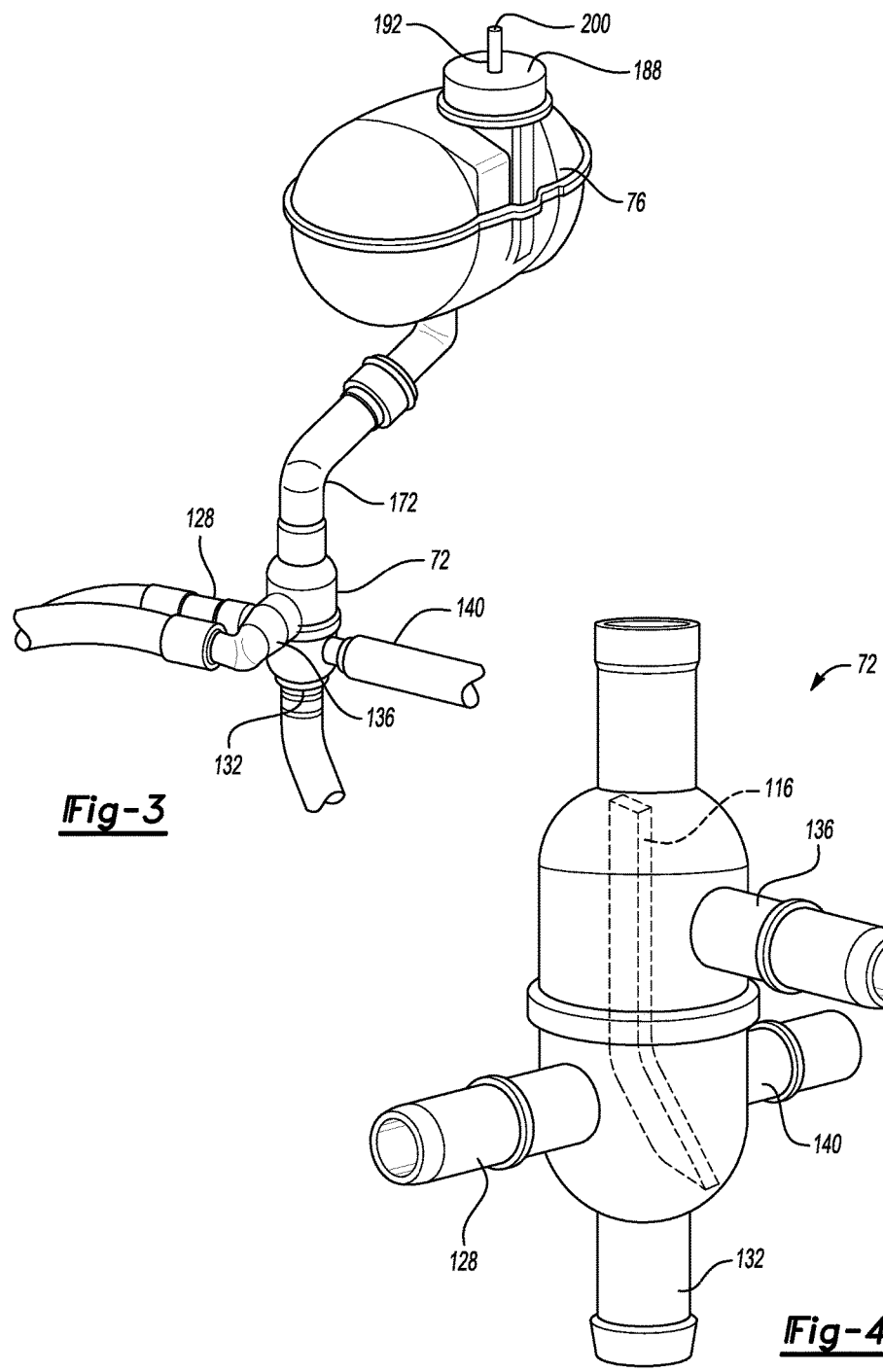

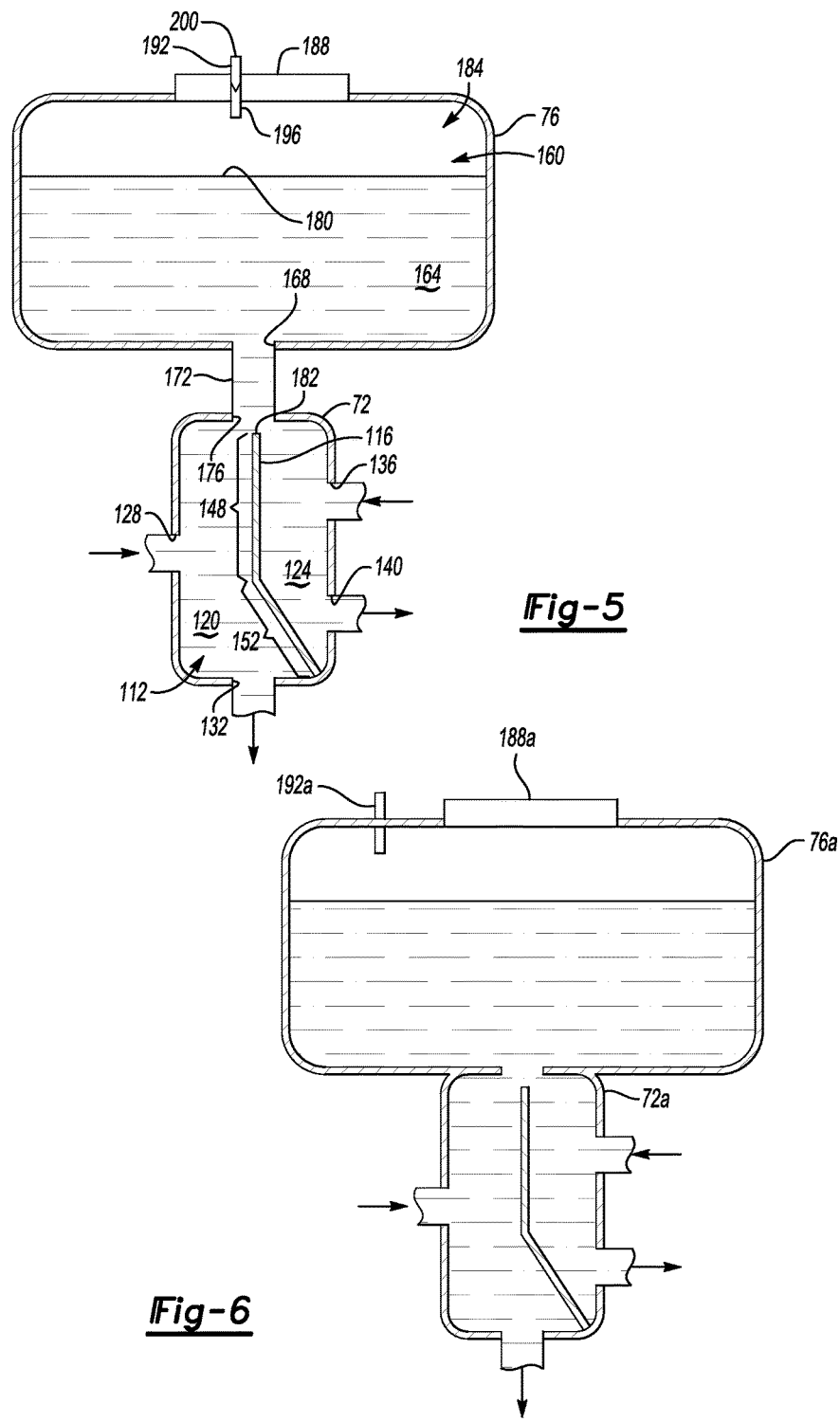

FLUID LOOP FILLING ASSEMBLY AND FILLING METHOD

TECHNICAL FIELD

This disclosure relates generally to filling fluid loops that are used within a vehicle to control thermal energy levels of various components.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Some electrified vehicles, and conventional vehicles, have multiple independent fluid loops or circuits. Fluid circulated through the fluid loops can be used to, for example, control the thermal energy levels of various components. Because the fluid loops can be configured to have different maximum fluid temperatures, the fluid loops can be separated from each other. Typically, a separate fluid supply reservoir is associated with each of the fluid loops.

SUMMARY

An assembly according to an exemplary aspect of the present disclosure includes, among other things, a manifold having an interior area with a baffle, and a reservoir. The baffle divides a portion of the interior area into a first region that is part of a first fluid loop of a vehicle, and a second region that is part of a separate, second fluid loop of the vehicle. The reservoir is configured to hold a supply of liquid that is in fluid communication with both the first and second regions.

In a further non-limiting embodiment of the foregoing assembly, the reservoir is vertically above the manifold such that the supply of liquid is gravity fed to the interior area.

A further non-limiting embodiment of any of the foregoing assemblies includes the supply of liquid held within the reservoir such that an uppermost surface of the supply is at a position vertically above an uppermost terminal end portion of the baffle.

A further non-limiting embodiment of any of the foregoing assemblies includes the supply of liquid held within the reservoir. The supply of liquid has a first total volume. The interior area of the manifold has a second total volume that is less than the first total volume.

In a further non-limiting embodiment of any of the foregoing assemblies, the reservoir is further configured to hold a volume of air that is deaerated from the first and second fluid loops.

In a further non-limiting embodiment of any of the foregoing assemblies, a first fluid loop manifold inlet opens to the first region and a first fluid loop manifold outlet opens from the first region. Also, a second fluid loop manifold inlet opens to the second region and a second fluid loop manifold outlet opens from the second region.

A further non-limiting embodiment of any of the foregoing assemblies includes a pressure relief valve with a first end opening to a region of air within the reservoir and a second end opening to an area outside the reservoir. The pressure within the reservoir is higher than a pressure outside the reservoir. The pressure relieve valve is configured to maintain the pressure within the reservoir to be below a threshold pressure.

In a further non-limiting embodiment of any of the foregoing assemblies, the baffle includes a first portion and a second portion vertically below the first portion. The first portion extends longitudinally in a first direction that is aligned with a general direction of flow of the liquid to the manifold from the supply. The second portion extends longitudinally in a second direction that is transverse to the first direction.

In a further non-limiting embodiment of any of the foregoing assemblies, the fluid is communicated to the first and second regions from the supply along a common flow path.

In a further non-limiting embodiment of any of the foregoing assemblies, the reservoir is secured to the manifold.

A method according to an exemplary aspect of the present disclosure includes, among other things, communicating a fluid from a supply within a reservoir to both a first and a second region within an interior area of a manifold. The first region is part of a first fluid loop of a vehicle. The second region is part of a separate second fluid loop of the vehicle.

In a further non-limiting embodiment of the foregoing method, a common fluid supply within the reservoir provides the fluid to both the first and second fluid loops.

In a further non-limiting embodiment of any of the foregoing methods, the communicating comprises gravity feeding the fluid from the supply within the reservoir to the both the first and the second regions within the interior area of the manifold.

A further non-limiting embodiment of any of the foregoing methods includes communicating air from the manifold to the reservoir. The air is deaerated from the first and second fluid loops.

In a further non-limiting embodiment of any of the foregoing methods, the interior of the reservoir is pressurized relative to an ambient pressure outside of the reservoir.

A further non-limiting embodiment of any of the foregoing methods includes separating the manifold into the first and second regions with a baffle disposed within manifold.

In a further non-limiting embodiment of any of the foregoing methods, the baffle is entirely submerged within the fluid.

In a further non-limiting embodiment of any of the foregoing methods, a level of the fluid is vertically above an uppermost portion of the baffle such that the fluid completely covers the baffle.

In a further non-limiting embodiment of any of the foregoing methods, a first fluid loop manifold inlet opens to the first region and a first fluid loop manifold outlet opens from the first region. Also, a second fluid loop manifold inlet opens to the second region and a second fluid loop manifold outlet opens from the second region.

In a further non-limiting embodiment of any of the foregoing methods, the baffle includes a first portion and a second portion vertically below the first portion. The first portion extends longitudinally in a first direction that is aligned with a general direction of flow of the fluid to the manifold from the reservoir. The second portion extending longitudinally in a second direction that is transverse to the first direction.

BRIEF DESCRIPTION OF THE FIGURES

The various features and advantages of the disclosed examples will become apparent to those skilled in the art

FIG. 3 illustrates a perspective view of a reservoir and manifold utilized in connection with the fluid loops of FIG. 2.

FIG. 4 illustrates a close-up view of the manifold of FIG. 3.

FIG. 5 illustrates a section view through the reservoir and manifold of FIG. 3.

FIG. 6 illustrates a section view of a reservoir and a manifold according to another exemplary embodiment.

DETAILED DESCRIPTION

This disclosure relates generally to a thermal management system within a vehicle that utilizes at least two separate fluid loops. One of the fluid loops can be used to control thermal energy within a first component of the vehicle. Another fluid loop can be used to control thermal energy within a second component of the electrified vehicle.

The fluid loops are supplied with fluid provided by a common reservoir. The fluid can be coolant, for example. A manifold divides fluid from the reservoir into the separate fluid loops.

Figure 1:
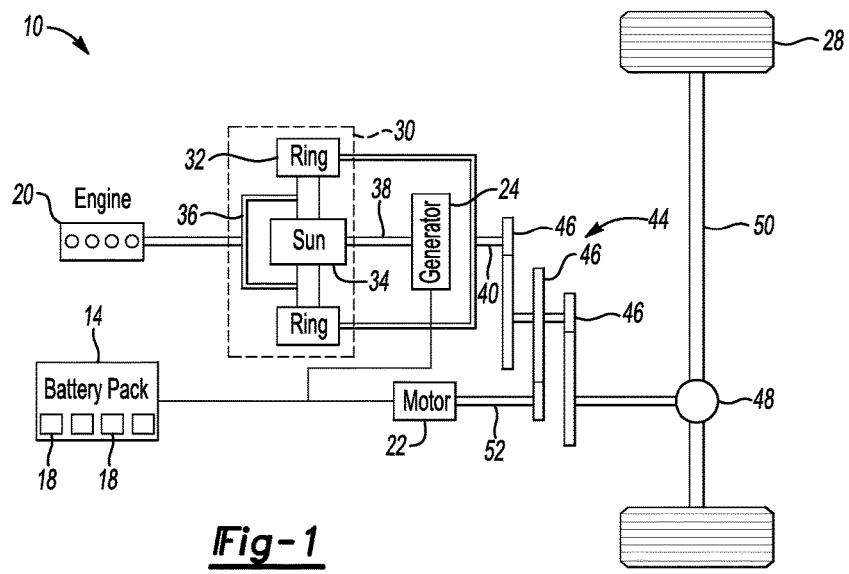
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18 held within an enclosure. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10. Since the battery pack 14 provides selectively powers propulsion, the battery pack 14 is a traction battery pack.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
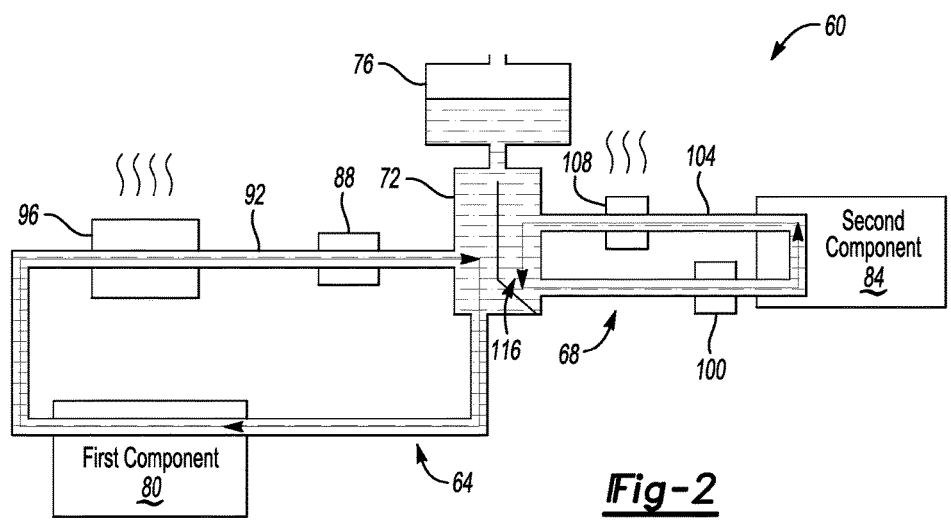
FIG. 2 shows a highly schematic view of a thermal management system utilized within the electrified vehicle of FIG. 1.

Referring now to FIG. 2 with continuing reference to FIG. 1, a thermal management system 60 is utilized within a vehicle having the powertrain 10. The thermal management system 60 is thus described in connection with an HEV, but other types of electrified vehicles, and even conventional vehicles, could benefit from the teachings of the thermal management system 60.

The thermal management system 60 includes a first fluid loop 64, a second fluid loop 68, a manifold 72, and a reservoir 76. The first fluid loop 64 extends from the manifold 72 to at least one first component 80 of the vehicle. The second fluid loop 68 extends from the manifold 72 to at least one second component 84 of the vehicle. The first fluid loop 64 and second fluid loop 68 are shown in this exemplary embodiment. In other exemplary embodiments, more than two fluid loops could be used.

In this exemplary embodiment, a first pump 88 circulates a first amount 92 of a fluid along the first fluid loop 64 to a position adjacent the first component 80 and then to a first heat exchanger 96. The first amount 92 of fluid, in this example, takes on thermal energy from the first component 80 to cool the first component 80. Thermal energy in the first amount 92 of fluid is then rejected to atmosphere at the first heat exchanger 96.

A second pump 100 circulates a second amount 104 of the fluid along the second fluid loop. The second amount 104 of fluid circulates from the second component 84 to a heat exchanger 108. The second amount 104 of fluid takes on thermal energy from the second component 84 to cool the second component 84. Thermal energy in the second amount 104 of fluid is then rejected to atmosphere at the second heat exchanger 108.

The first pump 88 and the second pump 100 can be the same, or different, types of pump. In a non-limiting embodiment, the first pump 88 and the second pump 100 are electrically powered fluid pumps. Other types of fluid pumps could be used in other examples.

The first heat exchanger 96 and the second heat exchanger 108 are fluid-to-air heat exchangers in this example. Other types of heat exchangers could be used in other examples, such a fluid-to-fluid heat exchangers or fluid-to-component heat exchangers.

The first component 80 can be, for example, a thermal exchange plate associated with the battery pack 14 of the powertrain 10. The thermal exchange plate takes on thermal energy from the battery cells 18 to cool the battery cells 18 of the battery pack 14.

The second component 84 can be, in an exemplary non-limiting embodiment, an electronic component, such as an integrated electronic controller or a DC/DC converter of the powertrain 10. Usage of the first fluid loop 64, and the second fluid loop 68 permits thermal energy levels of the first component 80 and the second component 84 to be maintained at different temperatures.

In this example, the first component 80 is configured to be cooled by the first amount 92 of the fluid to a first temperature. The second component 84 is configured to be cooled by the second amount 104 of the fluid at a second temperature, which is different than the first temperature. Accordingly, the first fluid loop 64 and the second fluid loop 68 are configured such that a maximum temperature of the first amount 92 of fluid within first fluid loop 64 is different than a maximum temperature of the second amount 104 of fluid within the second fluid loop 68.

In one exemplary non-limiting embodiment, a maximum temperature of the first amount 92 of fluid within the first loop 60 is 45° C., and a maximum temperature of the second amount 104 of fluid within the second fluid loop 68 is 70° C. A typical industry maximum temperature for a battery pack is 45° C., which sets, in this example, the maximum temperature of the first amount 92 of fluid.

Referring now to FIGS. 3-5 with continuing reference to FIGS. 1 and 2, the manifold 72 has an interior area 112. A baffle 116 is disposed within the interior area 112 to divide the interior area 112 into a first region 120 and a second region 124.

The first region 120 is part of the first fluid loop 64. That is, the first amount 92 of fluid moves through the first region 120 when circulated through the first fluid loop 64. The second region 124 is part of the second fluid loop 68. That is, the second amount 104 of fluid moves through the second region 124 when circulated through the second fluid loop 68.

Hoses can couple to the inlets and outlets of the manifold 72 to circulate fluid to and from the manifold 72.

To permit fluid flow through the manifold 72, a first fluid loop manifold inlet 128 opens to the first region 120, and a first fluid loop manifold outlet 132 opens from the first region 120. As the first amount 92 of the fluid circulates along the first fluid loop 64, fluid moves to the first region 120 through the first fluid loop manifold inlet 128, and from the first region 120 through the first fluid loop manifold outlet 132.

The manifold 72 further includes a second fluid loop manifold inlet 136 opening to the second region 124 and a second fluid loop manifold outlet 140 opening from the second region 124. As the second amount 104 of fluid circulates through the second fluid loop 68, fluid moves through the second fluid loop manifold inlet to the second region 124 and from the second region 124 through the second fluid loop manifold outlet.

In this example, the first fluid loop manifold inlet 128 is at a lateral side of the manifold 72 and the first fluid loop manifold outlet 132 is at a vertical bottom of the manifold 72. The second fluid loop manifold inlet 136 and the second fluid loop manifold outlet 140 are positioned on another side of the manifold 72.

The relative positions of the first fluid loop manifold inlet 128, the second fluid loop manifold inlet 136, and the second fluid loop manifold outlet 140 in the section view of FIG. 5 have been rotated for drawing clarity.

The baffle 116 includes a first portion 148 and a second portion 152. In this example, the first portion 148 extends longitudinally along a generally vertical axis. Vertical, for purposes of this disclosure, is with reference to a normal orientation of the reservoir 76 and manifold 72 and with reference to ground or horizon.

The second portion 152 extends transversely from the first portion 148. The orientation of the second portion 152 relative to the first portion 148 can facilitate directing flow from the first region 120 through the first fluid loop manifold outlet 132, and from the second region 124 through the second fluid loop manifold outlet 140.

The baffle 116 is the only baffle within the interior area 112 in this example. In other examples, more than one baffle within the interior area 112 could be used. Other baffles could be incorporated if, for example, more than two fluid loops circulate through the interior area 112. The baffle 116 prevents fluid from moving between the first region 120 and the second region 124.

The reservoir 76 is vertically above the manifold 72. The reservoir 76 has an interior area 160. The reservoir 76 holds a supply 164 of fluid within the interior area 160.

In this example, the reservoir 76 includes an outlet 168 at a vertical bottom of the reservoir 76. A conduit 172 connects the outlet 168 to a primary manifold inlet 176 at a vertical top of the manifold 72. Fluid from the supply 164 is gravity fed through the conduit 172 to the interior area 112 of the manifold 72. As the fluid flows downward through the primary manifold inlet 176, the baffle 116 divides the flow into the first region 120 or the second region 124. The reservoir 72 is thus in fluid communication with both the first region 120 and the second region 124, which keeps these regions filled. Keeping the first region 120 filled with fluid maintains the first amount 92 of fluid within the first fluid loop 64. Keeping the second region 124 filled with fluid maintains the second amount 104 of fluid within the second fluid loop 68.

The supply 164 of fluid is held within the interior area 160 of the reservoir 76 and maintain such that an uppermost level 180 of the fluid resides within the reservoir 76 during operation. This keeps the manifold 72 filled with fluid and ensures that the baffle 116 is submerged completely within fluid. That is, an uppermost terminal end portion 182 of the baffle 116 is below the uppermost level 180 and, in this example, below the primary manifold inlet 176. Keeping the baffle 116 submerged can facilitate fluid from the reservoir 76 continually filling the first fluid loop 64 and the second fluid loop 68 during operation.

In this example, the supply 164 of fluid within the reservoir 76 is maintained such that fluid remains in the reservoir 76 even when some of the fluid has gravity fed into manifold 72 to compensate for thermal contraction of the first amount 92 of fluid and the second amount 104 of fluid.

A volume of the interior area 160 of the reservoir 76 is greater than a volume of the interior area 112 of the manifold 72, which can help the reservoir 76 maintain sufficient the supply 164 in a sufficient amount to accommodate such thermal contraction in the first fluid loop 64 and the second fluid loop 68. The larger volume enables the reservoir 76 to hold more of the supply 164 of fluid.

The interior area 160 of the reservoir 76 further includes a region 184 of air, which can include air deaerated from the first fluid loop 64, air deaerated from the second fluid loop 68, or both. As air deaerates from within the first fluid loop 64 and the second fluid loop 68, the air moves vertically upward from the manifold 72, through the conduit 172, and escapes through the uppermost level 180 into the region 184 of air.

Making the interior volume 160 of the reservoir 76 to be greater than a manifold 72 can further ensure that the interior volume 160 is sufficiently large to accommodate the air deaerated from the first fluid loop 64 and the second fluid loop 68.

A cap 188 is removably secured to the reservoir 76. The cap 188 can be removed from the reservoir 76 to permit filling of the reservoir 76 with additional fluid.

In this example, a pressure relief valve 192 is incorporated into the cap 188. In another example, the pressure relief valve 192 is incorporated into another area of the reservoir 76, such as a wall of the reservoir 76.

The pressure relief valve 192 has a first end 196 opening to the region 184 of air within the reservoir 76. A second end 200 of the pressure relief valve 192 opens to an ambient environment outside the interior volume 160 of the reservoir 76.

The pressure within the reservoir 76 is higher than the pressure outside the reservoir 76. The pressure relieve valve 192 is configured to maintain the pressure within the reservoir 76 to be below a threshold pressure that could be 20 psi, for example.

When the cap 188 is secured to the reservoir 76, the pressure relief valve maintains a pressure within the interior area 160 of the reservoir 76 to be higher than the ambient environment outside the reservoir 76. This pressurizes the fluid within the reservoir 76, the manifold 72, which can facilitate proper filling, and operational pressure, of the first fluid loop 64 and the second fluid loop 68.

In another example, the pressure relieve valve 192 is omitted and the pressure within the reservoir 76 tracks ambient pressure outside the reservoir 72.

The manifold 72 is described as being used in connection with two separate fluid loops. In other examples, the manifold could be modified for use with more than two separate fluid loops by, for example, incorporating another baffle to define a third region, and an inlet and outlet associated with the third region.

Referring to FIG. 6, another example reservoir 76 is fluidly coupled to a manifold 72a. The reservoir 76a and the manifold 72a are structured similarly to the reservoir 76 and the manifold 72 of FIGS. 2-5. However, the reservoir 76 is fluidly coupled to the manifold 72a without the use of the conduit 172. Also, a pressure relief valve 192a extends through a wall of the reservoir 76 rather than a cap 188a.

Some features of the disclosed examples include a single reservoir utilized to fill separate fluid loops within a vehicle. A manifold incorporates a baffle that permits the filling from the single reservoir while separately maintaining the flow of fluid within the separate fluid loops, which can facilitate utilizing the fluid loops to maintain components cooled by fluid within the fluid loops at different temperatures. That is, the manifold with the baffle permits the fluid loops to operate with fluids having differing maximum temperatures within the fluid loops. The common reservoir reduces complexity associated with systems having separate fluid loops and separate reservoirs. The baffle permits deaeration from the different fluid loops through the manifold to the reservoir while maintaining temperature separation between the different fluid loops.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly, comprising
   a manifold having an interior area;
   a baffle dividing a portion of the interior area into a first region that is part of a first fluid loop of a vehicle, and a second region that is part of a separate, second fluid loop of the vehicle; and
   a reservoir configured to hold a supply of liquid that is in fluid communication with both the first and second regions,
   the baffle including a first portion and a second portion vertically below the first portion, the first portion extending longitudinally in a first direction that is aligned with a general direction of flow of the liquid to the manifold from the supply, the second portion extending longitudinally in a second direction that is transverse to the first direction.

2. The assembly of claim 1, wherein the reservoir is vertically above the manifold such that the supply of liquid is gravity fed to the interior area.

3. The assembly of claim 1, further comprising the supply of liquid held within the reservoir such that an uppermost surface of the supply is at a position vertically above an uppermost terminal end portion of the baffle.

4. The assembly of claim 1, further comprising the supply of liquid held within the reservoir, the supply of liquid have a first total volume, the interior area of the manifold having a second total volume that is less than the first total volume.

5. The assembly of claim 1, wherein the reservoir is further configured to hold a volume of air that is deaerated from the first and second fluid loops.

6. The assembly of claim 1, wherein a first fluid loop manifold inlet opens to the first region and an first fluid loop manifold outlet opens from the first region, and a second fluid loop manifold inlet opens to the second region and a second fluid loop manifold outlet opens from the second region.

7. The assembly of claim 1, further comprising a pressure relief valve with a first end opening to a region of air within the reservoir and a second end opening to an area outside the reservoir, the pressure within the reservoir higher than a pressure outside the reservoir, the pressure relieve valve configured to maintain the pressure within the reservoir to be below a threshold pressure.

8. The assembly of claim 1, wherein the fluid is communicated to the first and second regions from the supply along a common flow path.

9. The assembly of claim 1, wherein the reservoir is secured to the manifold.

10. A method, comprising:
    communicating a fluid from a supply within a reservoir to both a first and a second region within an interior area of a manifold, the first region part of a first fluid loop of a vehicle, the second region part of a separate second fluid loop of the vehicle; and
    separating the manifold into the first and second regions with a baffle disposed within manifold, the baffle includes a first portion and a second portion vertically below the first portion, the first portion extending longitudinally in a first direction that is aligned with a general direction of flow of the fluid to the manifold from the reservoir, the second portion extending longitudinally in a second direction that is transverse to the first direction.

11. The method of claim 10, wherein a common fluid supply within the reservoir provides the fluid to both the first and second fluid loops.

12. The method of claim 10, wherein the communicating comprises gravity feeding the fluid from the supply within the reservoir to the both the first and the second regions within the interior area of the manifold.

13. The method of claim 10, further comprising communicating air from the manifold to the reservoir, the air deaerated from the first and second fluid loops.

14. The method of claim 10, wherein the interior of the reservoir is pressurized relative to an ambient pressure outside of the reservoir.

15. The method of claim 10, wherein the baffle is entirely submerged within the fluid.

16. The method of claim 10, wherein a level of the fluid is vertically above an uppermost portion of the baffle such that the fluid completely covers the baffle.

17. The method of claim 10, wherein a first fluid loop manifold inlet opens to the first region and a first fluid loop manifold outlet opens from the first region, and a second fluid loop manifold inlet opens to the second region and a second fluid loop manifold outlet opens from the second region.

18. A vehicle assembly, comprising
a manifold having an interior area;
a baffle dividing a portion of the interior area into a first region of a first fluid loop, and a second region of a separate, second fluid loop; and
a reservoir configured to hold a supply of a liquid in fluid communication with both the first and second regions when liquid is circulated through the first and second fluid loops,
wherein a first portion of the baffle extends longitudinally in a first direction that is aligned with a general direction of flow of the liquid to the manifold from the reservoir, wherein a second portion of the baffle is vertically below the first portion and extends longitudinally in a second direction that is transverse to the first direction.

* * * * *